United States Patent
Yatsko et al.

(10) Patent No.: US 7,240,620 B2
(45) Date of Patent: Jul. 10, 2007

(54) EASY VEHICLE TURNAROUND

(76) Inventors: Suzanne Malott Yatsko, 971 Visalia St., Pismo Beach, CA (US) 93449; David Allen Yatsko, 971 Visalia St., Pismo Beach, CA (US) 93449

( * ) Notice: Subject to any disclaimer, the term of this patent is extended or adjusted under 35 U.S.C. 154(b) by 0 days.

(21) Appl. No.: 10/907,488

(22) Filed: Apr. 3, 2005

(65) Prior Publication Data
US 2006/0219125 A1 Oct. 5, 2006

(51) Int. Cl.
*B60S 13/02* (2006.01)

(52) U.S. Cl. ...................................... 104/44

(58) Field of Classification Search ................ 104/35, 104/36, 38, 44, 45
See application file for complete search history.

(56) References Cited

U.S. PATENT DOCUMENTS

| | | | |
|---|---|---|---|
| 244,703 A | 7/1881 | White | |
| 813,462 A | 2/1906 | Stickney | |
| 819,014 A | 4/1906 | Hillenbrand | |
| 838,329 A | 12/1906 | Hillenbrand | |
| 878,135 A | 2/1908 | Hastings | |
| 1,378,898 A * | 5/1921 | Potts | 104/36 |
| 1,532,728 A | 4/1925 | Brobst | |
| 1,596,156 A | 8/1926 | Craig | |
| 1,753,550 A | 4/1930 | Cook | |
| 1,772,075 A | 5/1930 | Exon | |
| 1,797,830 A | 3/1931 | Koehler | |
| 1,843,047 A | 1/1932 | Smith | |
| 1,993,648 A | 3/1935 | Cook | |
| 2,025,320 A | 12/1935 | Waalkes | |
| 2,080,506 A | 5/1937 | Ash | |
| 2,135,924 A | 11/1938 | Toews | |
| 2,244,598 A | 6/1941 | Ash | |
| 2,566,634 A | 9/1951 | Ready | |
| 2,952,221 A | 9/1960 | Hobel | |
| 3,566,798 A | 3/1971 | Petzman | |
| 3,566,799 A | 3/1971 | Stern | |
| 4,172,422 A * | 10/1979 | McBride | 104/44 |
| 4,562,774 A | 1/1986 | Dehring | |
| 4,608,929 A | 9/1986 | Park | |
| 4,753,173 A | 6/1988 | James | |
| 4,777,884 A | 10/1988 | Seay | |
| 4,841,870 A | 6/1989 | Coles | |
| 5,086,704 A | 2/1992 | Mueller | |
| 5,755,160 A * | 5/1998 | Blufordcraving | 104/36 |

(Continued)

FOREIGN PATENT DOCUMENTS

FR 2585312 A1 1/1987

(Continued)

*Primary Examiner*—S. Joseph Morano
*Assistant Examiner*—Robert J. McCarry, Jr.
(74) *Attorney, Agent, or Firm*—William Keyworth; Bill & Mary Lou Inc.

(57) ABSTRACT

An equipment turnaround easily installs on a driveway or garage floor surface. The turnaround has a large support platform compared to the equipment footprint providing ease of loading or unloading the equipment. The turnaround is fastened to the surface by fasteners that allow the turnaround to rotate about the centerline of the drive mechanism surface contact plate. This changes the direction the equipment is facing, allowing equipment to be parked in a narrow space without having to back the equipment out of the space. Alternately the turnaround may be used for a rotatable equipment display. The turnaround may be turned manually or use a self-contained power supply.

10 Claims, 5 Drawing Sheets

U.S. PATENT DOCUMENTS 6,123,310 A 9/2000 Paskiewicz
6,467,746 B1 * 10/2002 Paskiewicz .............. 248/349.1
2004/0208383 A1 10/2004 Bossen

FOREIGN PATENT DOCUMENTS

| GB | 2315473 A | 2/1998 |
| WO | PCT/AU87/00251 | 2/1998 |
| WO | PCT/AU97/00881 | 7/1998 |

* cited by examiner

EASY VEHICLE TURNAROUND

CROSS-REFERENCE TO RELATED APPLICATIONS

Not Applicable.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to a rotatable equipment support device for moving a vehicle or other equipment in a rotary motion and a method of manufacturing such a device.

2. Descripton of Related Art

Rotatable equipment supports are known in the art. This equipment may be used as a turnaround to revise the direction of a vehicle or other equipment, or for a rotating display of a vehicle or other equipment.

A number of designs of automobile turntables were proposed late in the 19$^{th}$ century or in the early part of the last century at the end of the era of the horse-drawn car and at the dawn of the automobile industry. Examples of these early manually-operated designs are U.S. Pat. No. 244,703 (White) U.S. Pat. No. 813,462 (Stickney), U.S. Pat. No. 819,014 (Hillenbrand), U.S. Pat. No. 878,135 (Hastings), U.S. Pat. No. 1,572,728 (Brobst), U.S. Pat. No. 1,596,156 (Craig), U.S. Pat. No. 1,753,550 (Cook), U.S. Pat. No. 1,797,830 (Koehler), U.S. Pat. No. 1,843,047 (Smith), and U.S. Pat. No. 2,080,506 (Ash). A characteristic of these is a limited range of equipment they would accommodate, and the need for considerable skill in installing equipment due to the use of narrow tracks to support the equipment. In the examples not employing narrow tracks, a design requires excavation and a foundation to install the device.

A more modern version of the manual turntable is proposed in U.S. Pat. No. 6,467,746 (Paskiewicz). This recognizes a manual turntable is suitable only for smaller equipment, such as motorcycles or snowmobiles.

Motorized turntables, either having their own motor or using power from the equipment supported, or using the weight of the supported equipment, were proposed as early as the 1920's through the end of the last century, examples using narrow tracks to support the equipment are U.S. Pat. No. 1,378,8898 (Potts), U.S. Pat. No. 1,772,075 (Exon), U.S. Pat. No. 2,135,924 (Toews), U.S. Pat. No. 2,244,598 (Ash), U.S. Pat. No. 2,952,221 (Hobel), U.S. Pat. No. 3,566,798 (Peitzman), U.S. Pat. No. 4,172,422 (McBride), U.S. Pat. No. 4,562,774 (Dehring), U.S. Pat. No. 4,608,929 (Park), U.S. Pat. No. 4,841,870 (Coles), U.S. Pat. No. 5,086,704 (Mueller), and U.S. Pat. No. 5,755,160 (Blufor-craving).

Motorized turntables employing a circular platform to support the equipment are described in U.S. Pat. No. 2,025,320 (Waalkes) U.S. Pat. No. 2,566,634 (Ready), U.S. Pat. No. 3,566,799 (Stern), U.S. Pat. No. 4,562,774 (Dehring), U.S. Pat. No. 4,753,173 (James), and U.S. Pat. No. 4,777,884 (Seay, Jr.). Such turntables use excessive material due to the wasted space if the footprint of the equipment supported is rectangular and the turntable is round.

Turntables employing rectangular platforms and using power from the equipment supported, or using the weight of the supported equipment to rotate the turntable are described in U.S. Pat. No. 1,993,648 (Cook) and U.S. Pat. No. 4,562,774 (Dehring). These require a substantial and unique foundation to be installed prior to installing the turntable.

SUMMARY OF THE INVENTION

The present invention is a rotatable equipment support for rotating one or more equipment items on a hard surface. The hard surface is concrete, steel, or other surface able to support the weight of the equipment items supported. The equipment support has a frame with a top side and a bottom side. It rotates about a center of rotation. Its periphery is in a shape providing an area larger than the footprint of the equipment to be supported. An equipment support surface interior side is connected to and covers the frame, and the equipment is supported on the exterior side. The frame is supported on a set of cylindrical rollers, which are oriented with the axis of rotation toward the center of rotation. A surface contact plate connects to the frame through a rotation shaft and bearing. The contact plate bottom surface contacts the hard surface and is connected to the hard surface through attachment devices. The support frame is free to rotate on the bearing around the center of the surface contact plate.

The equipment support may be rotated around the surface contact plate center of rotation manually, or by an electrical motor driven drive mechanism. If the drive mechanism is used, it has a control system using a remote control transmitter, and is reversible so the support may be rotated in either direction. The drive mechanism and control are powered by batteries, or other self-contained electrical power supply, such as fuel cells, mounted on the frame. Recharging of the batteries or refueling of the power supply is done periodically to maintain the equipment support drive mechanism in a condition to rotate the device.

Manufacture of the equipment turnaround requires preparing the frame with two or more lateral supports, one or more ramp supports, a multiplicity of roller support members, a multiplicity of longitudinal support members and a drive mechanism support tray containing the bearing for the surface contact plate rotation shaft. A drive mechanism including an electric motor, a worm gear, a first chain drive, a second chain drive, and a surface contact plate may be installed to rotate the turnaround. The frame and drive mechanism is covered by attachment of an equipment support surface to the frame. The drive mechanism is equipped with a control system including a receiver that controls one or more electrical relays. A self-contained power supply provides power.

Objects and Advantages

One object of this invention is to provide a turnaround that is easy to install in the desired location, and is installed on existing driveways and garage floors.

A second object of this invention is to provide a turnaround that is economical in the use of materials, but provides a support surface with margin for the footprint of the equipment supported so equipment is easily installed on the turnaround.

A third object of this invention is to provide a self-powered turnaround.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 1:
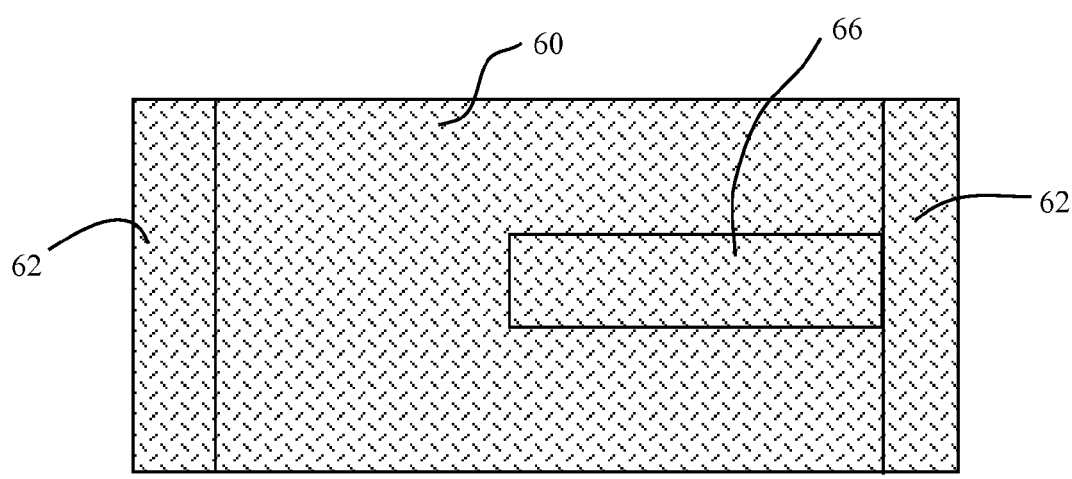
FIG. 1 is a top view of the easy equipment turnaround.

These reference numbers are used in the drawings to refer to areas or features of the invention.

40 Lateral Support
42 Ramp Support
50 Roller Support Member
52 Longitudinal Support
53 Stiffener
54 Drive Mechanism Support Tray
60 Equipment Support Surface
62 Ramp Support Surface
64 Side Cover
66 Drive Access Plate
70 Electric Motor
72 Worm Gear
73 Drive Sprocket
74 Driven Sprocket
78 Chain
80 Surface Contact Plate
82 Surface Contact Plate Center of Rotation
83 Attachment Device Opening
84 Attachment Devices
86 Hard Surface
88 Rotation Shaft
90 Cylindrical Roller
92 Roller Axle
96 Bearing
100 Transmitter
102 Receiver
104 Relay
108 Self Contained Power Supply
110 Disconnect Switch
112 Stop Switch
114 Charging Connection

DETAILED DESCRIPTION OF THE INVENTION

Figure 2:
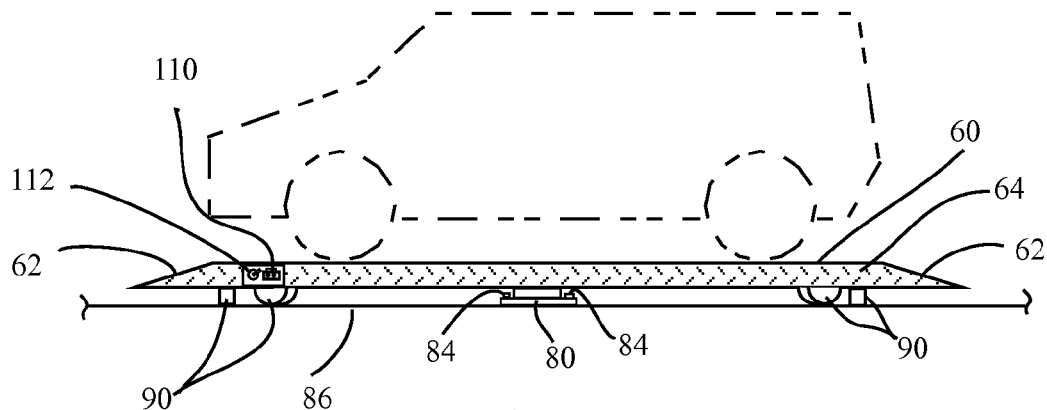
FIG. 2 is a side view of the easy equipment turnaround. The opposite side is similar and therefore is not shown. This figure shows a motor vehicle in place on the equipment support and illustrates the footprint of the vehicle.
Figure 3:
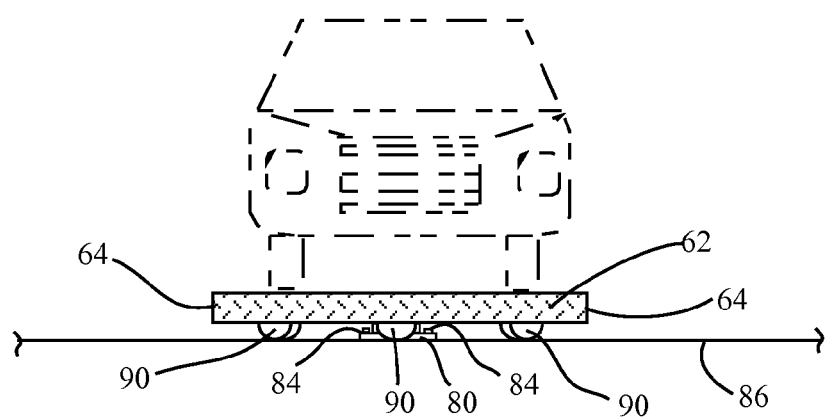
FIG. 3 is an end view of the easy equipment turnaround. The opposite end is similar and therefore is not shown. This figure shows a motor vehicle in place on the equipment support and illustrates the footprint of the vehicle.

The easy equipment turnaround is a rotatable equipment support as shown in FIGS. 1–8. FIGS. 1, 2 and 3 show the top, side, and end views respectively. As shown, the turnaround has an equipment support surface (60) enclosing the entire top surface of the support from one side to the other and from a front ramp (62), at one end of the turnaround to a rear ramp (62) at the opposite end. The ramps, which are used for rolling equipment onto the support surface, also have a ramp support surface (62) enclosing the entire top surface of the ramps from one side to the other and from the end to the joint with the equipment support surface. The ramp support surface (62) slopes from the equipment support surface (60) elevation, down toward the hard surface (86). The equipment support surface has a removable drive access plate (66) to allow for maintenance of the drive mechanism and initial installation of the turnaround. Enclosing the top surface allows for a wide variation in the footprint of the equipment supported by the turnaround. FIGS. 2 and 3 show a front and side view of a footprint, which is the arrangement of a motor vehicle's tire road contact surface, supported by the turnaround. The footprint may also be the floor or road contact surface arrangement other than tires for equipment not using tires. The turnaround equipment support surface area is made greater than this footprint area. This provides margin for locating the equipment item on the turnaround, making equipment installation easier. The support surfaces are diamond plate or equivalent patterned aluminum or steel sheet or plate material. Side covers (64) are installed on each side to provide structural rigidity to the turnaround. FIG. 2 also shows the disconnect switch (110) stop switch (112) and charging connection (114) location.

The turnaround is supported on a hard surface (86) by rollers (90) as shown in FIGS. 2 and 3. The hard surface is typically reinforced concrete or it may be asphalt with an imbedded steel ring. The surface must be suitably wear resistant for the weight of the equipment supported on the footprint of the turnaround rollers, and sufficiently smooth and level to provide for ease of rotation of the rollers when the turnaround is rotated. The turnaround is rotated by a drive mechanism that provides a rotational force on a surface contact plate (80) that is attached to the hard surface (86) with several attachment devices (84) (example, concrete fasteners such as a threaded bolt and concrete anchor). Access to these fasteners is available by removing the drive access plate (66) and may require rotating the turnabout for access to all of them. The rotational torque applied to the hard surface support plate, which is connected to the hard surface by attachment devices (84), causes the turnaround to rotate.

Figure 4:
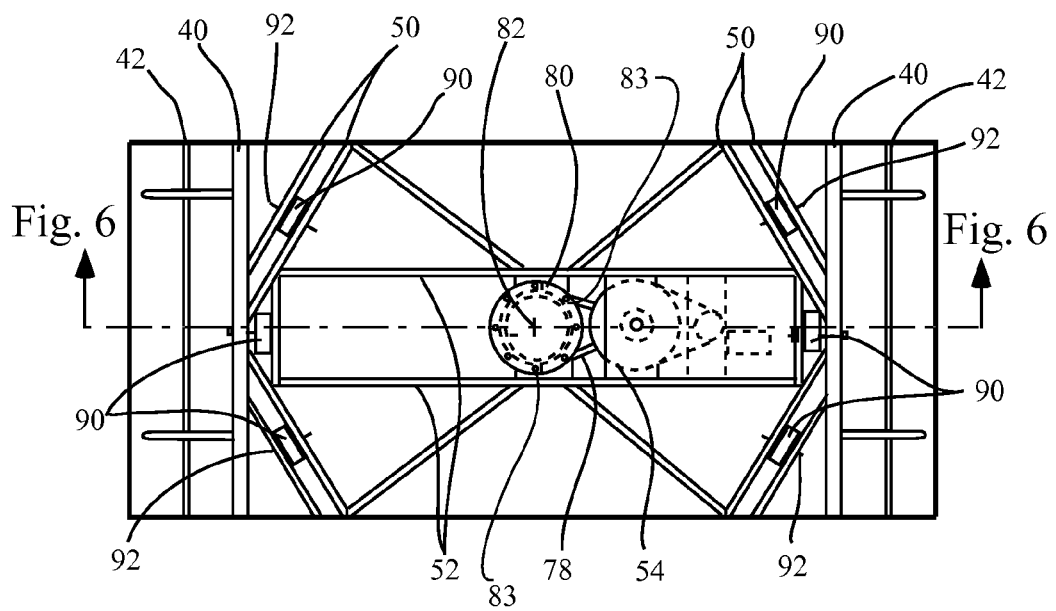
FIG. 4 is a bottom view of the easy equipment turnaround. This figure shows the location of the cross-section of FIG. 6
Figure 7:
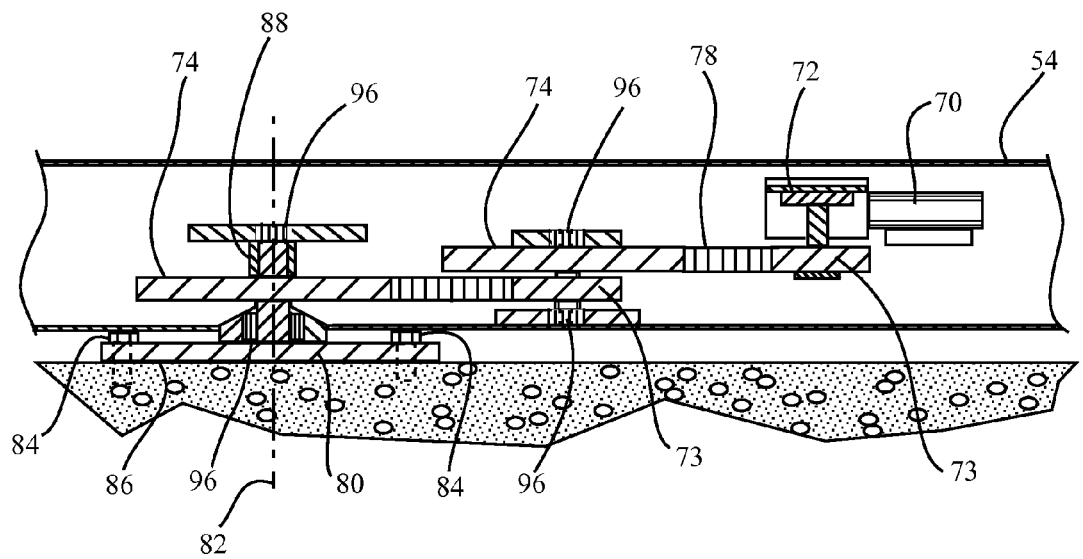
FIG. 7 is a magnified view of the location shown in FIG. 6.

FIG. 4 shows a bottom view of the turnaround. The arrangement of the drive mechanism components as well as the cylindrical rollers (90) is shown. FIG. 4 also shows the components of the frame including the lateral supports (40), the roller support members (50) that attach to stiffeners (53), the longitudinal supports (52), and the ramp supports (42) that include lateral and longitudinal members, and the drive mechanism support tray (54), which provides additional longitudinal and lateral support and also supports the drive mechanism. The frame components are manufactured of aluminum, steel or carbon fiber connected by welding and/or fasteners. They also are attached to the equipment support surface (60), ramp support surface (62), and side covers (64) by welding and/or fasteners to provide an integrated structure that uses the structural strength of the support surface material to enhance the strength of the structure. The rollers (90) are supported on roller axles (92) that are on an axis that is directed to the surface contact plate center of rotation (82). The surface contact plate (80) has attachment device openings (83) around the periphery as shown. The attachment devices (84) are shown in FIGS. 2, 3, and 7 installed in the openings.

Figure 5:
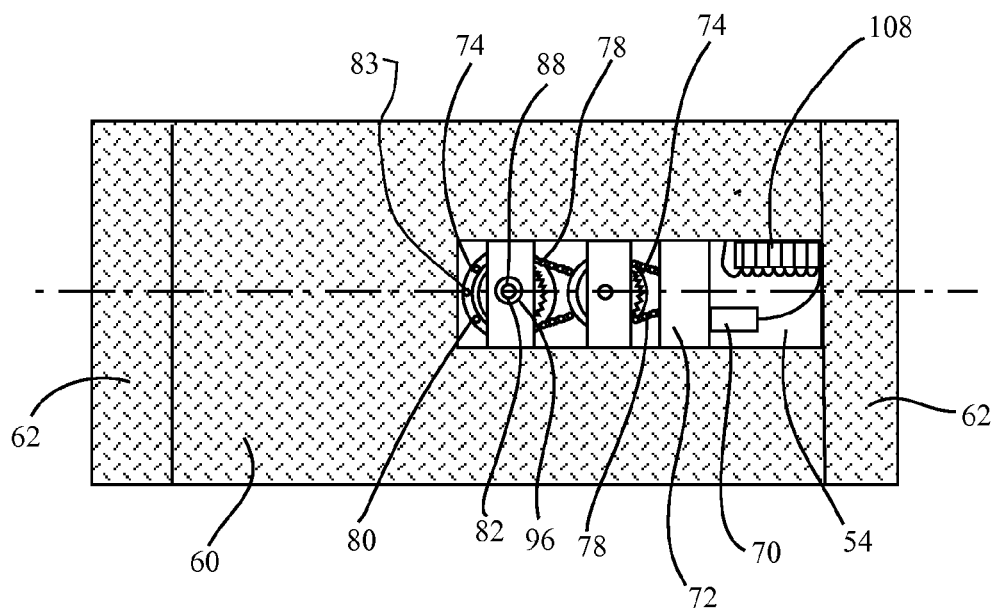
FIG. 5 is a top view of the easy equipment turnaround with the drive access plate removed.

FIG. 5 shows a top view of the turnaround with the drive access plate (66), as shown in FIG. 1, removed. This shows the arrangement of the drive mechanism installed in the drive mechanism support tray (54), including the battery (108), electric motor (70) worm gear (72), two sets of drive sprockets (73) and driven sprockets (74), (or the equivalent in gears or belt drives), and the surface contact plate (80) which is connected to the rotation shaft (88) which is connected to the frame by bearings (96).

Figure 6:
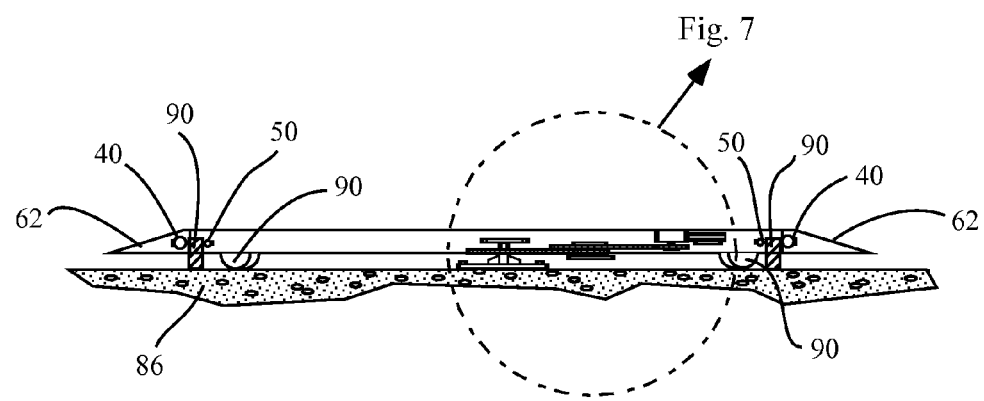
FIG. 6 is a cross-section view of the easy equipment turnaround at the location shown in FIG. 4. This figure shows the location of the magnified view in FIG. 7.

FIG. 6 shows a cutaway side view of the turnaround on the axis shown in FIG. 4. This shows the drive mechanism in relation to the rollers. FIG. 7 is an expanded view of the drive mechanism detail indicated in FIG. 6. The drive mechanism transfers the high revolution per minute (RPM) speed of the electric motor (70) to a low RPM speed (about 1.5 RPM) of the turnaround when rotated. The turnaround rotates around the center of rotation of the surface contact plate (82) by the turning motion applied by two stages of chain drive (or equivalent, such as gears or belt drives) speed reductions. Each stage consists of a drive sprocket (73) and a driven sprocket (74) as shown in FIG. 7. The shafts connecting the sprockets are supported in bearings (96) that in turn are positioned in the bearing mounts shown. The bearing mounts are supported in the drive mechanism support tray (54). The first stage drive sprocket (73) is turned by a worm gear (72) that has a pinion gear driven by the electric motor (70). The turning torque on the surface contact plate (80), which is attached to the hard surface by attachment devices (84), is transmitted by the rotation shaft (88) through the frame to the equipment support surface (60), ramp support surface (62), and side covers (64) to turn the equipment resting on the support surface.

Figure 10:
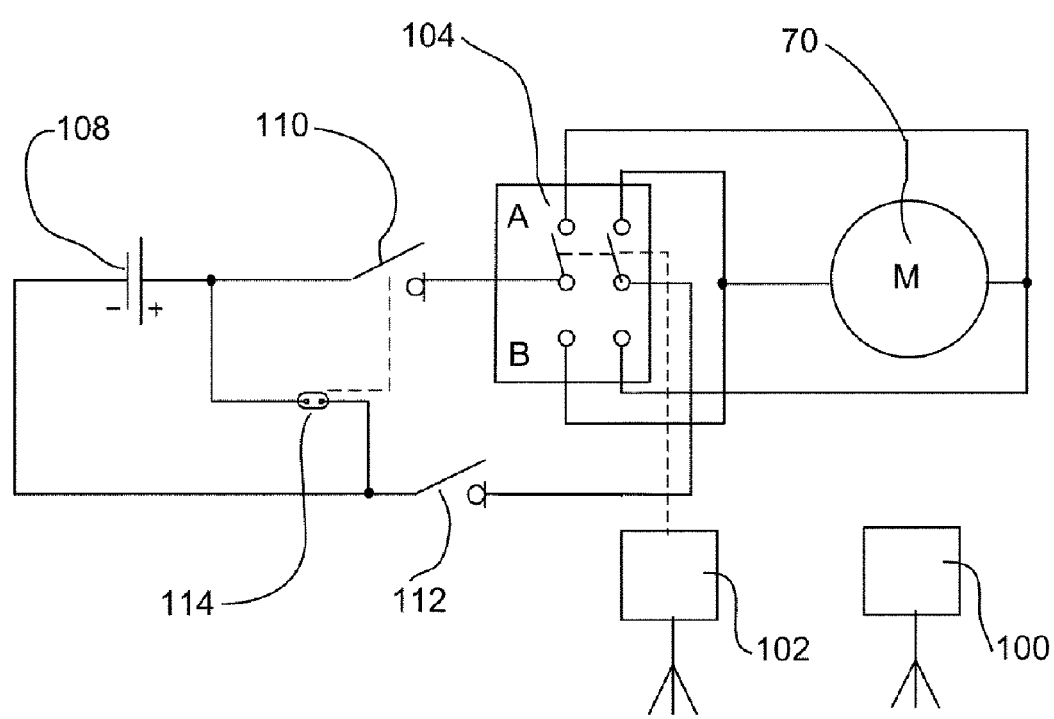
FIG. 10 is a schematic diagram of the drive mechanism motorized control for rotation of the easy equipment turnaround.

The control system means for control of the electric motor are shown in FIG. 10. A self-contained power supply consisting of batteries or a battery equivalent, such as a fuel cell, is provided. A hand held transmitter (100) provides a signal to turn clockwise, counterclockwise, or stop. This signal is detected by the receiver (102) and the receiver provides an output to the relay (104), or a logic equivalent combination of relays, to apply power to the electric motor (70). The transmitter and receiver may use radio or other frequencies to communicate between them. On receipt of a signal to move clockwise, the receiver (102) provides an output to latch the relay (104) in the "A" position to turn the motor in the direction to provide clockwise rotational motion of the turnaround. This connects the positive power to the electric motor terminal on the right side of the diagram and negative power to the electric motor terminal on the left side. Similarly if the receiver receives a signal to move counterclockwise, it provides an output to latch the relay in the "B" position to reverse the motor connections and turn it in the opposite direction. If the receiver senses a stop signal, an output to the relay to unlatch from either the "A" or "B" positions is given. This removes power from the motor and stops the turnaround rotation. Some variations in the wiring may be necessary for different motor and relay designs.

Figure 8:
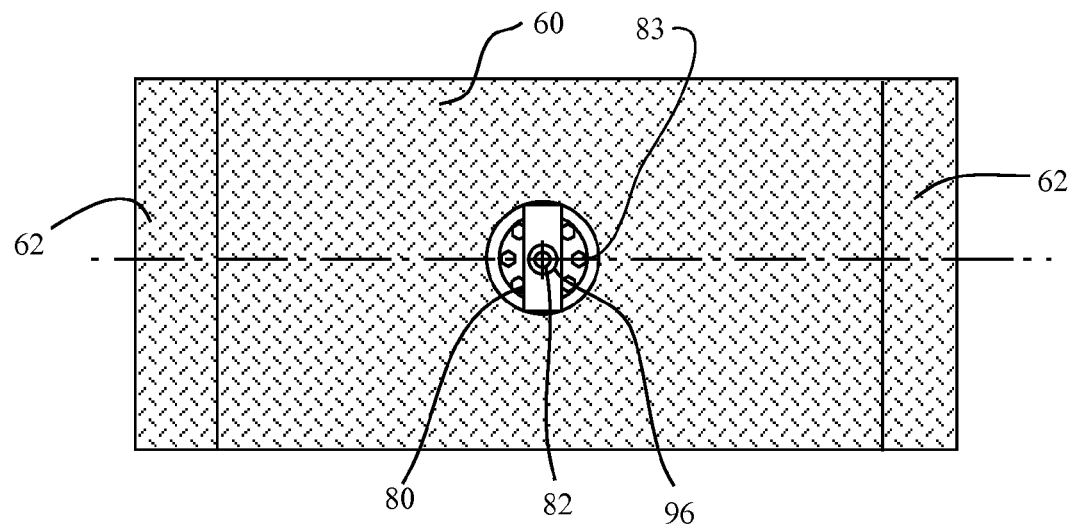
FIG. 8 is a top view of an embodiment of the easy equipment turnaround using manual rotation.

A stop switch (112) is provided on the exterior of the turnaround as shown in FIG. 8 to remove power from the motor. An example location of the stop switch is shown on FIG. 2. A charging connection (114) is also provided on the exterior of the turnaround. This is interlocked with a disconnect switch (110) to remove power from the motor when the battery charger is connected.

ALTERNATE EMBODIMENTS

Figure 9:
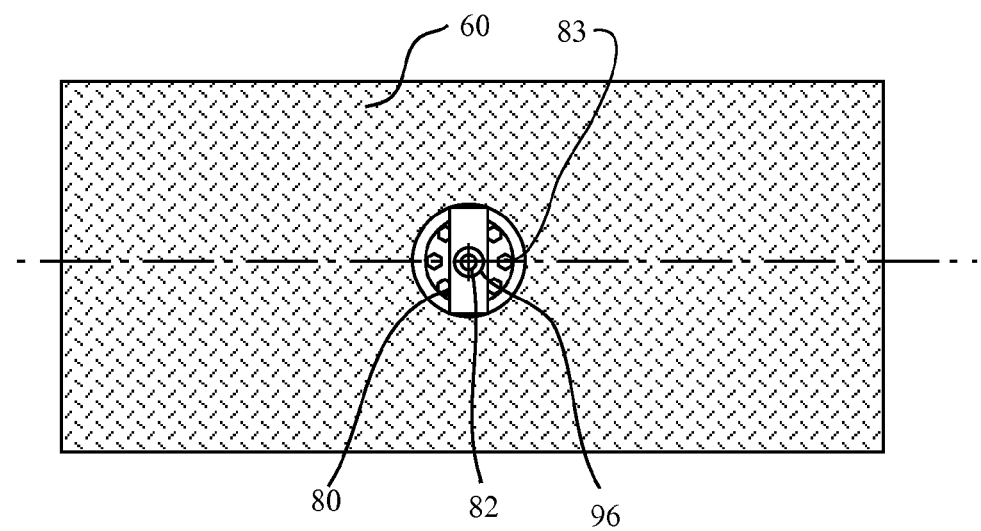
FIG. 9 is a top view of an embodiment of the easy equipment turnaround without ramps.

Those familiar with the art recognize there are many possible applications and embodiments for the easy equipment turnaround. Examples that will be apparent are the device may be sized to accommodate equipment of different sizes. An example is a smaller size of the turnaround may be used for garden equipment or motorcycles or a larger size may be used for farm implements. The smaller size may not require an electrical motor drive mechanism, using manual rotation as described under operation, below. FIG. 8 shows this embodiment with the drive mechanism consisting of the surface contact plate (80) connected to the frame by the rotation shaft (88) and bearing (96). An alternate variation to the manual rotation embodiment is a turnaround that does not require a ramp due to being built with a low profile such that the equipment supported may readily be moved onto the low turnaround equipment support surface (60). FIG. 9 shows this embodiment. Variations may also be made to the frame and support surface configuration details to allow for shipment of the turnaround in sections and subsequent assembly of the frame and support surface at the intended site using fasteners. This recitation of the preferred and other embodiments is not intended to define or constrain the invention, rather the claims define the invention.

Operation

Initial installation of the turnaround involves selecting the location for it and determining the desired location of the center of rotation. A template providing the pattern of the attachment device openings (83) in the surface contact plate relative to the center of rotation is used to install any portions of the fasteners required to be installed below the surface contact plate. If fasteners not requiring installation below the surface contact plate are used the template is used to mark the desired location of the attachment device openings. The turnaround is then positioned so the surface contact plate center of rotation is at the desired location. This may be ascertained by removing the drive access plate (66) to observe the locations of the attachment device openings (83) in the surface contact plate relative to the installed portions of the fasteners or the markings. The turnaround is then attached to the surface. This completes installation.

Operation of the turnaround after installation may involve initially orienting it so as to facilitate placing equipment on the turnaround. The transmitter may be used to turn it clockwise or counterclockwise so the ramp support surface is facing the direction desired for moving the equipment on the turnaround. Alternately the turnaround may simply be manually turned to the desired direction by applying a turning force on the side of the turnaround near the end of one of the ramps. The equipment may then be driven or pushed up the ramp to the equipment support surface.

Removal of equipment supported on the turnaround may involve orienting the turnaround so as to facilitate removal of the equipment in the desired direction. The remote control may be used to turn it clockwise or counterclockwise so the ramp support surface is facing the direction desired. Alternately, the turnaround may simply be manually turned to the desired direction by applying a turning force on the periphery of the turnaround sufficient to overcome the inertia of the mass of the equipment and turnaround and the friction of the rollers.

The battery probably requires a recharge if the turnaround will not rotate using the transmitter. A battery charger may be connected to the charging connection on the turnaround and plugged into a power outlet to provide charging power to the battery. Power to the turnaround motor is removed when charging so it cannot be rotated using the transmitter until the battery charger is removed.

What is claimed is:

1. A rotatable equipment support on a hard surface for rotating one or more equipment items with a known footprint comprising:
   a. a frame with a top side, a bottom side, a center of rotation, and a periphery with a first side and a second side, a first end and a second end, the periphery arranged in a shape providing an area larger than the equipment item footprint;
   b. an equipment support surface with an exterior side and a interior side, the support surface interior side connected to the frame, the support surface covering the frame periphery;
   c. a surface contact plate with a top side and a bottom side and a center of rotation, a rotation shaft connected to the contact plate center of rotation, the rotation shaft rotatively connected to the frame and arranged with the contact plate center of rotation at the frame center of rotation, the contact plate arranged such that the contact plate bottom surface contacts the hard surface;
   d. a multiplicity of cylindrical rollers with a roller outer surface and a roller axis, the rollers supportively and rotatively connected to the frame and arranged such that the roller outer surface contacts the hard surface, and the roller axis oriented toward the surface contact plate center of rotation;
   e. attachment device openings configured for attachment devices for connecting the surface contact plate to the hard surface; and
   f. a drive mechanism arranged to rotate the frame around the surface contact plate center of rotation, wherein an equipment item supported on the equipment support surface is rotated to a desired position by applying a force to the frame periphery.

2. The rotatable equipment support of claim 1 further comprising:
   a. the drive mechanism with an electrical motor and a self-contained power supply arranged to rotate the frame around the surface contact plate center of rotation wherein an equipment item placed on the support surface may be rotated by applying the power supply to the electrical motor; and
   b. means for control of the electrical motor.

3. The rotatable equipment support of claim 1 further comprising a front ramp and a rear ramp, each with multiple support members connected to the frame and a ramp support surface connected to the equipment support surface and arranged to slope from the equipment support surface toward the hard surface, wherein equipment moved up the front ramp is elevated to the equipment support surface and stopped on the equipment support surface and the equipment support is rotated to place the equipment in the desired direction and the equipment is moved down the rear ramp to the hard surface elevation.

4. The rotatable equipment support of claim 2 further comprising:
   a. the means for control of the electrical motor is a transmitter arranged to signal clockwise rotation, counterclockwise rotation, and stop and a receiver arranged to receive the signal from the transmitter and actuate one or more electrical relays; and
   b. the self-contained power supply arranged with the one or more electrical relays such that electrical power may be applied to the electric motor in the clockwise direction, the counterclockwise direction, and electrical power may be removed from the electric motor.

5. The rotatable equipment support of claim 3 further comprising:
   a. the drive mechanism with an electrical motor and a self-contained power supply arranged to rotate the frame around the surface contact plate center of rotation wherein an equipment item placed on the support surface may be rotated by applying the power supply to the electrical motor; and
   b. means for control of the electrical motor.

6. The rotatable equipment support of claim 5 further comprising:
   a. the means for control of the electrical motor is a transmitter arranged to signal clockwise rotation, counterclockwise rotation, and stop and a receiver arranged to receive the signal from the transmitter and actuate one or more electrical relays; and
   b. the self-contained power supply arranged with the one or more electrical relays such that electrical power may be applied to the electric motor in the clockwise direction, the counterclockwise direction, and electrical power may be removed from the electric motor.

7. An equipment turnaround installed on a hard surface to change the angular orientation of an equipment item comprising:
   a. a frame with a top and a bottom, a first side and a second side, and a first end and a second end, including one or more lateral supports, one or more ramp supports arranged at the ends, a multiplicity of roller support members, a multiplicity of longitudinal support members and a drive mechanism support tray;
   b. an equipment support surface with an interior side and an exterior side, and one or more ramp support surfaces with an interior side and an exterior side, the equipment support surfaces and ramp support surfaces interior side attached to the frame top from the frame first side to the frame second side and from the frame first end to the frame second end, and one or more side covers with an interior side and an exterior side, the side covers attached to the frame first and second sides;
   c. a drive mechanism with an electric motor, a worm gear, a first speed reduction, a second speed reduction, and a surface contact plate with a center of rotation and arranged with a multiplicity of removable connection openings, a multiplicity of attachment devices arranged to attach the surface contact plate to the hard surface, the drive mechanism arranged within the frame drive mechanism support tray, the electric motor arranged to turn the worm gear, the first speed reduction arranged with a drive sprocket turned by the worm gear, a driven sprocket, and a chain connecting the drive and driven sprockets and arranged such that the drive sprocket turns at a lower revolutionary speed than the driven sprocket, and the second speed reduction arranged with a drive sprocket turned by the first chain drive driven sprocket, a driven sprocket, and a chain connecting the drive and driven sprockets and arranged such that the drive sprocket turns at a lower revolutionary speed than the driven sprocket, and the second speed reduction driven sprocket arranged to move the frame and equipment turnaround covering rotationally around the surface contact plate center of rotation;

d. a multiplicity of rollers mounted to the frame roller support members by axles arranged such that the axle center of rotation is directed at the surface contact plate center of rotation, and such that the rollers support the frame above the hard surface, wherein rotation of the rollers rotate the frame around the surface contact plate center of rotation; and e. a self-contained power supply arranged with the one or more electrical relays such that electrical power may be applied to the electric motor in the clockwise direction, the counterclockwise direction, and electrical power may be removed from the electric motor.

8. The equipment turnaround as in claim 7 further comprising a drive mechanism control with a transmitter arranged to signal clockwise rotation, counterclockwise rotation, and stop, and a receiver arranged to receive the signal from the transmitter and actuate one or more electrical relays.

9. A method of manufacturing an equipment turnaround comprising:

a. assembling a frame with a top side, a bottom side, a periphery with a first side, a second side, a first end and a second end, and a multiplicity of lateral supports, a multiplicity of roller support members, a multiplicity of longitudinal support members, and a drive mechanism support tray;

b. installing a drive mechanism in the drive mechanism support tray with a surface contact plate arranged with a center of rotation and a multiplicity of attachment device openings configured for attachment devices;

c. supporting a multiplicity of rollers on the roller support members such that the roller axis is directed to the surface contact plate center of rotation; and d. attaching a equipment support surface to the frame such that it extends from the periphery first side to the second side, and from the periphery first end to the second end.

10. The method of manufacturing an equipment turnaround as in claim 9 further comprising:

a. installing means for rotation of the turnaround by an electrical motor controlled by one or more electrical relays;

b. connecting a drive mechanism receiver arranged to control the electrical relays;

c. connecting a self-contained power supply to the drive mechanism electrical motor relays and drive mechanism receiver.

* * * * *